US012669840B2

(12) United States Patent
Terrovitis

(10) Patent No.: US 12,669,840 B2
(45) Date of Patent: Jun. 30, 2026

(54) POWER SWITCHING REGULATOR WITH CONFIGURABLE STORAGE VOLTAGE OUTPUT

(71) Applicant: Atmosic Technologies, Inc., Campbell, CA (US)

(72) Inventor: Manolis Terrovitis, Athens (GR)

(73) Assignee: Atmosic Technologies, Inc., Campbell, CA (US)

( * ) Notice: Subject to any disclaimer, the term of this patent is extended or adjusted under 35 U.S.C. 154(b) by 188 days.

(21) Appl. No.: 18/532,986

(22) Filed: Dec. 7, 2023

(65) Prior Publication Data

US 2024/0219948 A1      Jul. 4, 2024

Related U.S. Application Data

(60) Provisional application No. 63/436,411, filed on Dec. 30, 2022.

(51) Int. Cl.
| *G05F 1/67* | (2006.01) |
| *H02M 1/00* | (2006.01) |
| *H02M 1/10* | (2006.01) |
| *H02M 3/00* | (2006.01) |

(52) U.S. Cl.
CPC ............ *G05F 1/67* (2013.01); *H02M 1/0083* (2021.05); *H02M 1/10* (2013.01); *H02M 3/003* (2021.05)

(58) Field of Classification Search
CPC ...... H02M 1/0083; H02M 1/10; H02M 3/003; H02M 1/67
See application file for complete search history.

(56) References Cited

U.S. PATENT DOCUMENTS

| 2007/0018502 A1* | 1/2007 | Bazinet | .................. | H02M 1/10 |
| | | | | 307/80 |
| 2017/0279276 A1* | 9/2017 | Amin | ........................ | H02J 7/35 |
| 2018/0034279 A1* | 2/2018 | Frenila | .................. | G01R 21/00 |

(Continued)

OTHER PUBLICATIONS

URL: http://e-peas.com/aem10330_product-brief/ Product Brief from the company e-peas for the product AEM10330 - Highly Versatile, Regulated Single-Output, Buck-Boost Ambient Energy Manager for Up to 7-cell Solar Panels. Copyright 2021. PB_AEM10330_Rev1. 0.†

*Primary Examiner* — Lakaisha Jackson
(74) *Attorney, Agent, or Firm* — Meunier Carlin & Curfman LLC

(57) ABSTRACT

Implementations are disclosed for a power switching regulator defined to be used for power harvesting but is instead configured to include an additional power rail. A switching regulator includes a first contact defined as a first power input to the switching regulator (with the first contact coupled to a first power source), a second contact defined as a second power input to the switching regulator (with the second contact defined to be coupled to a harvester), and a third contact whose output is defined as a storage voltage for harvesting. Instead of the third contact being used for outputting a storage voltage for harvesting, the third contact is coupled to a voltage (VSTORE) power rail for providing power (that may be configurable) to one or more electronic components of the electronic device (such as a CPU to perform dynamic voltage scaling or by a power amplifier sensitive to power efficiency).

16 Claims, 4 Drawing Sheets

(56)     References Cited

U.S. PATENT DOCUMENTS

| | | | |
|---|---|---|---|
| 2018/0152137 A1* | 5/2018 | Nakamoto | H02J 7/35 |
| 2020/0076240 A1* | 3/2020 | Papadopoulos | H04Q 9/00 |
| 2020/0144839 A1† | 5/2020 | De Vos | |
| 2022/0239150 A1† | 7/2022 | De Vos | |
| 2023/0113677 A1† | 4/2023 | Boley | |

\* cited by examiner
† cited by third party

400

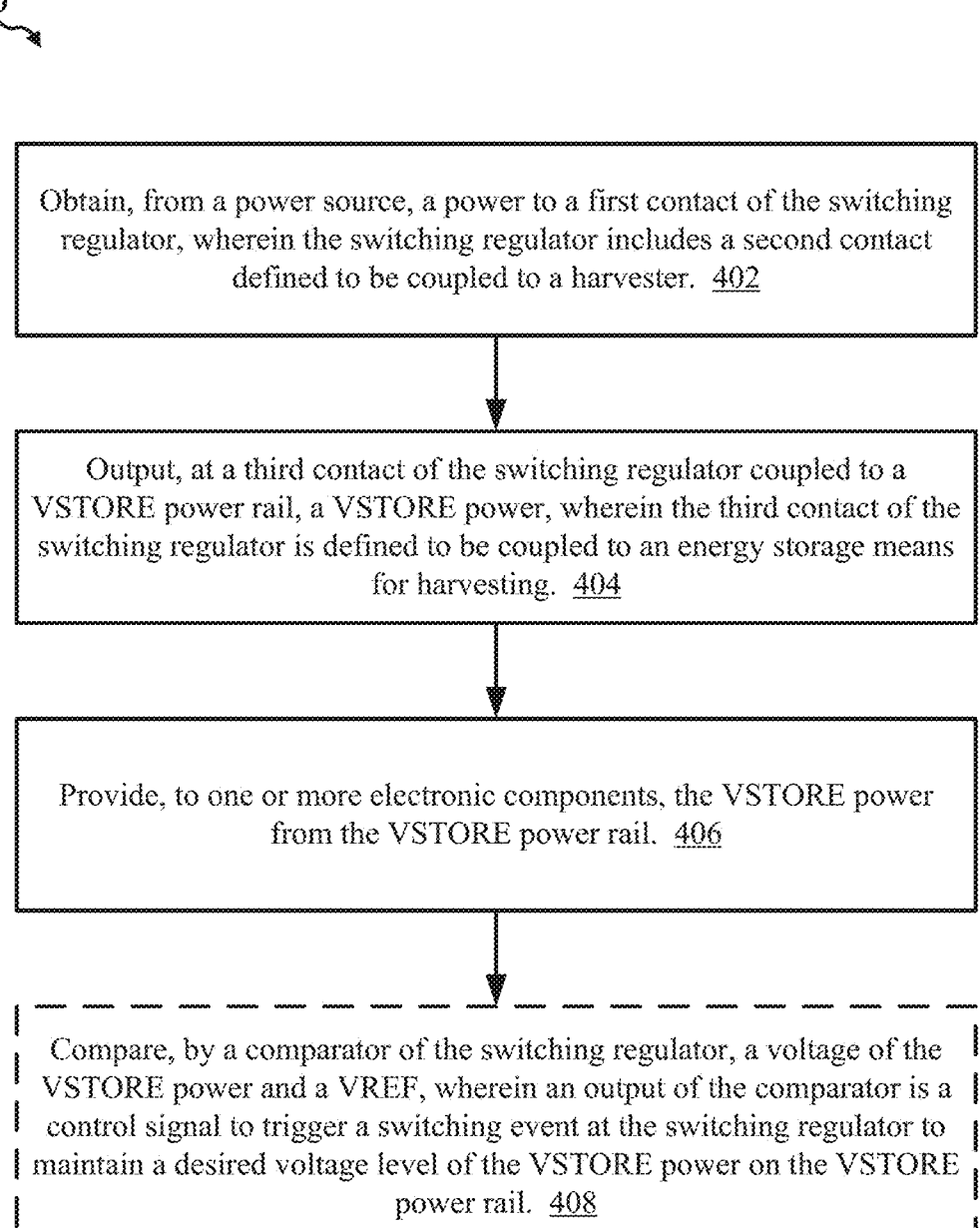

Obtain, from a power source, a power to a first contact of the switching regulator, wherein the switching regulator includes a second contact defined to be coupled to a harvester. 402

Output, at a third contact of the switching regulator coupled to a VSTORE power rail, a VSTORE power, wherein the third contact of the switching regulator is defined to be coupled to an energy storage means for harvesting. 404

Provide, to one or more electronic components, the VSTORE power from the VSTORE power rail. 406

Compare, by a comparator of the switching regulator, a voltage of the VSTORE power and a VREF, wherein an output of the comparator is a control signal to trigger a switching event at the switching regulator to maintain a desired voltage level of the VSTORE power on the VSTORE power rail. 408

Figure 4

POWER SWITCHING REGULATOR WITH CONFIGURABLE STORAGE VOLTAGE OUTPUT

CROSS-REFERENCE TO RELATED APPLICATIONS

This patent application claims priority to U.S. Provisional Patent Application No. 63/436,411 entitled "POWER SWITCHING REGULATOR WITH CONFIGURABLE STORAGE VOLTAGE OUTPUT" and filed on Dec. 30, 2022, which is assigned to the assignee hereof. The disclosures of all prior applications are considered part of and are incorporated by reference in this patent application.

TECHNICAL FIELD

The present implementations relate generally to power switching regulators, and specifically to a power switching regulator with a configurable storage voltage output.

BACKGROUND OF RELATED ART

Various electronic devices include a harvester to harvest electricity from its environment. For example, a harvester may generate electricity from external vibrations or other physical forces existing in the harvester's environment. The output from the harvester may be provided to a power regulator, such as a power switching regulator (also referred to as a switching regulator), to regulate the power output by the harvester for use by one or more components.

For many electronic devices that utilize a harvester, power can also be provided to components via an alternate power supply (such as a battery) in case, e.g., the harvester is unable to provide sufficient power. In order to be able to switch between the harvester and the alternate power supply supplying power, a multi-input switching regulator may be used, with multiple power sources attached to the inputs of the switching regulator. The switching regulator is configured to include a contact that attaches to an energy storage means that is charged by the harvester, and once charged the potential stored at the storage means can then be supplied through the switching regulator as a power at an output of the switching regulator (such as at a supply voltage (VDD) output).

SUMMARY

The systems, methods, and devices of this disclosure each have several innovative aspects, no single one of which is solely responsible for the desirable attributes disclosed herein.

One innovative aspect of the subject matter described in this disclosure can be implemented in an electronic device. The electronic device includes a first input to receive a power from a power source and a switching regulator. The switching regulator includes a first contact defined as a first power input to the switching regulator (with the first contact coupled to the first input), a second contact defined as a second power input to the switching regulator (with the second contact defined to be coupled to a harvester), and a third contact whose output is defined as a storage voltage for harvesting. The third contact is defined to be coupled to an energy storage means that stores energy harvested from the harvester, but the third contact is coupled to a storage voltage (VSTORE) power rail for one or more electronic components and the output at the third contact is a VSTORE power on the VSTORE power rail. As such, energy from the first input is delivered to the VSTORE power rail.

Another innovative aspect of the subject matter described in this disclosure can be implemented as a method of operating an electronic device that includes a switching regulator. The method includes obtaining, from a power source, a power to a first contact of a switching regulator. The switching regulator includes a second contact defined to be coupled to a harvester. The method also includes outputting, at a third contact of the switching regulator coupled to a storage voltage (VSTORE) power rail, a VSTORE power. The third contact of the switching regulator is defined to be coupled to an energy storage means for harvesting. The method also includes providing, to one or more electronic components, the VSTORE power from the VSTORE power rail.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Aspects of the present disclosure are illustrated by way of example and are not intended to be limited by the figures of the accompanying drawings.

FIG. 4 is an illustrative flowchart 400 of operating an electronic device including a switching regulator.

Like numbers reference like elements throughout the drawings and specification.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The described implementations can be implemented in any electronic device that includes a switching regulator originally defined for use for energy harvesting but that the device does not utilize energy harvesting capabilities defined for the switching regulator.

For an electronic device configured for energy harvesting (referred to simply as harvesting), the electronic device includes an energy storage means to store the energy harvested by the harvester, and the energy storage means may be coupled to the energy harvester via a switching regulator. A switching regulator is a power regulator that provides a stable power supply at a steady voltage, with the switching regulator defined to output such powers at one or more specific voltages. For a switching regulator defined to enable harvesting for an electronic device, the switching regulator may be a multi-input switching regulator to receive power from the harvester that harvests power from its environment (such as from vibrations or physical movements) as well as one or more other power supplies (such as from a battery).

In this manner, if the harvester is unable to harvest and the energy storage means does not include sufficient power to be output by the switching regulator for one or more power rails, the switching regulator may switch from using the harvester or the energy storage means to using, e.g., the battery to power the output of the switching regulator.

Figure 1:
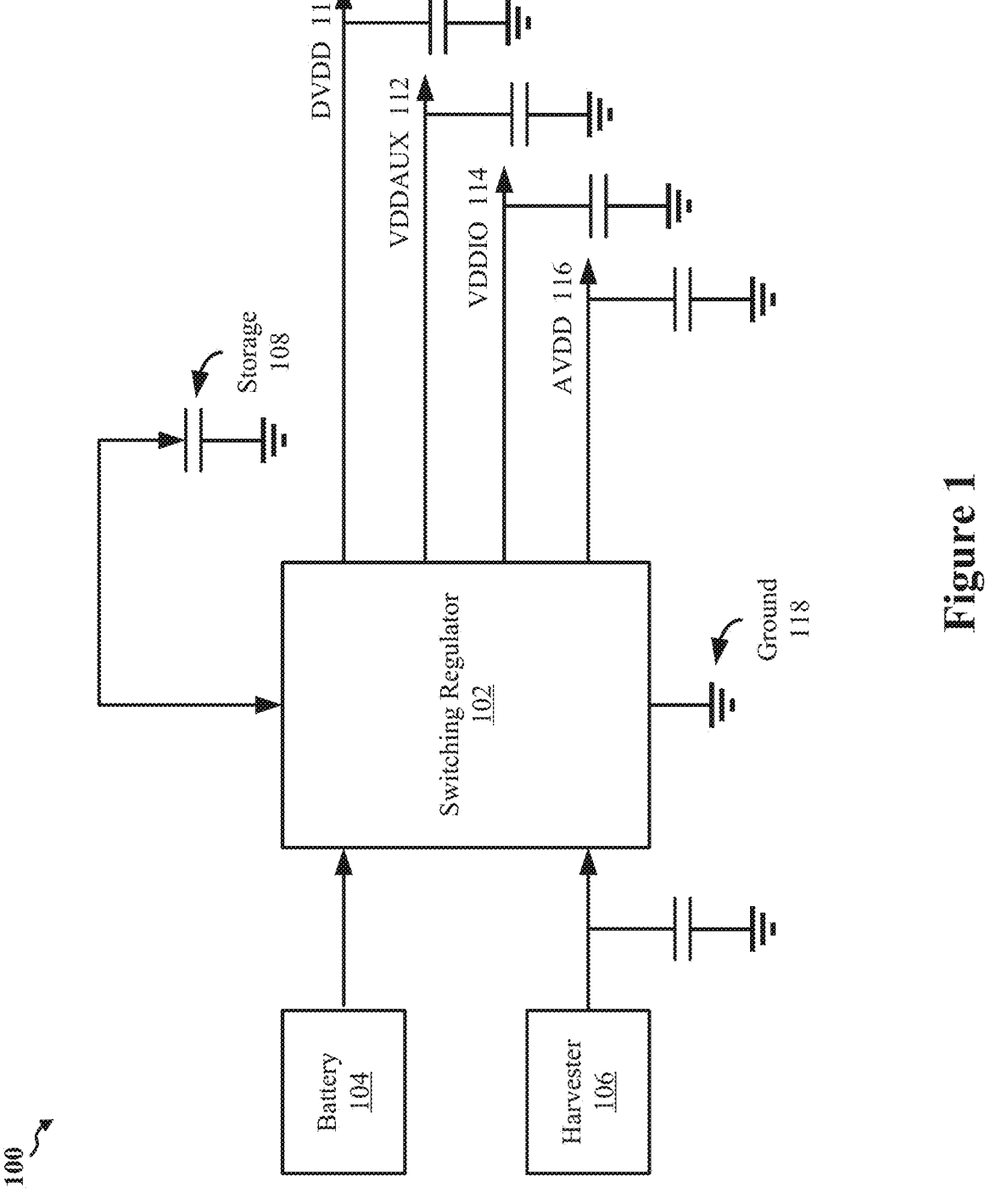
FIG. 1 shows a block diagram of a power circuit including a switching regulator.

FIG. 1 shows a block diagram of a power circuit 100 including a switching regulator 102. The power circuit 100 may be part of an electronic device and configured to provide the power rails 110-116 used by the various electronic components of the electronic device. The switching regulator 102 is defined to handle harvesting by the harvester 106 for the electronic device, with storage 108 being charged by the harvester 106 to store energy to later be discharged for one or more of the voltage rails 110-116. The storage 108 may be any suitable energy storage means (such as a capacitor, capacitor bank, battery, etc.). The switching regulator is also configured to receive a power output by battery 104 (or any other suitable power source, such as a transformer providing power from an AC source, such as a home's electrical grid).

The switching regulator 102 is defined to provide power to one or more of the power rails 110-116 from one of the battery 104, the harvester 106, or the storage 108. The switching regulator 102 uses ground 118 to generate a potential across an inductor in order to store energy on the inductor and then transfer the stored energy to a destination, such as the power rails 110-116 or storage 108. The process of transferring energy from a power source to a destination via the inductor involves a sequence of states of a number of switches included in the switching regulator and is referred to herein as a switching event.

In FIG. 1, the example switching regulator 102 provides outputs of a digital VDD (DVDD) power rail 110, an auxiliary VDD (VDDAUX) power rail 112, an input/output VDD (VDDIO) power rail 114, and an analog VDD (AVDD) power rail 116. As such, the switching regulator 102 is a multi-input, multi-output switching regulator coupled to multiple power sources and configured to provide power to multiple power rails. For example, the multi-input, multi-output switching regulator 102 may be a discontinuous mode, single inductor switching regulator to control the charge and discharge across storage 108 and maintain defined voltage levels for the power rails via various switches of the switching regulator 102. A simplified example of the switches is depicted in the switching regulator 102 shown in FIG. 2.

Figure 2:
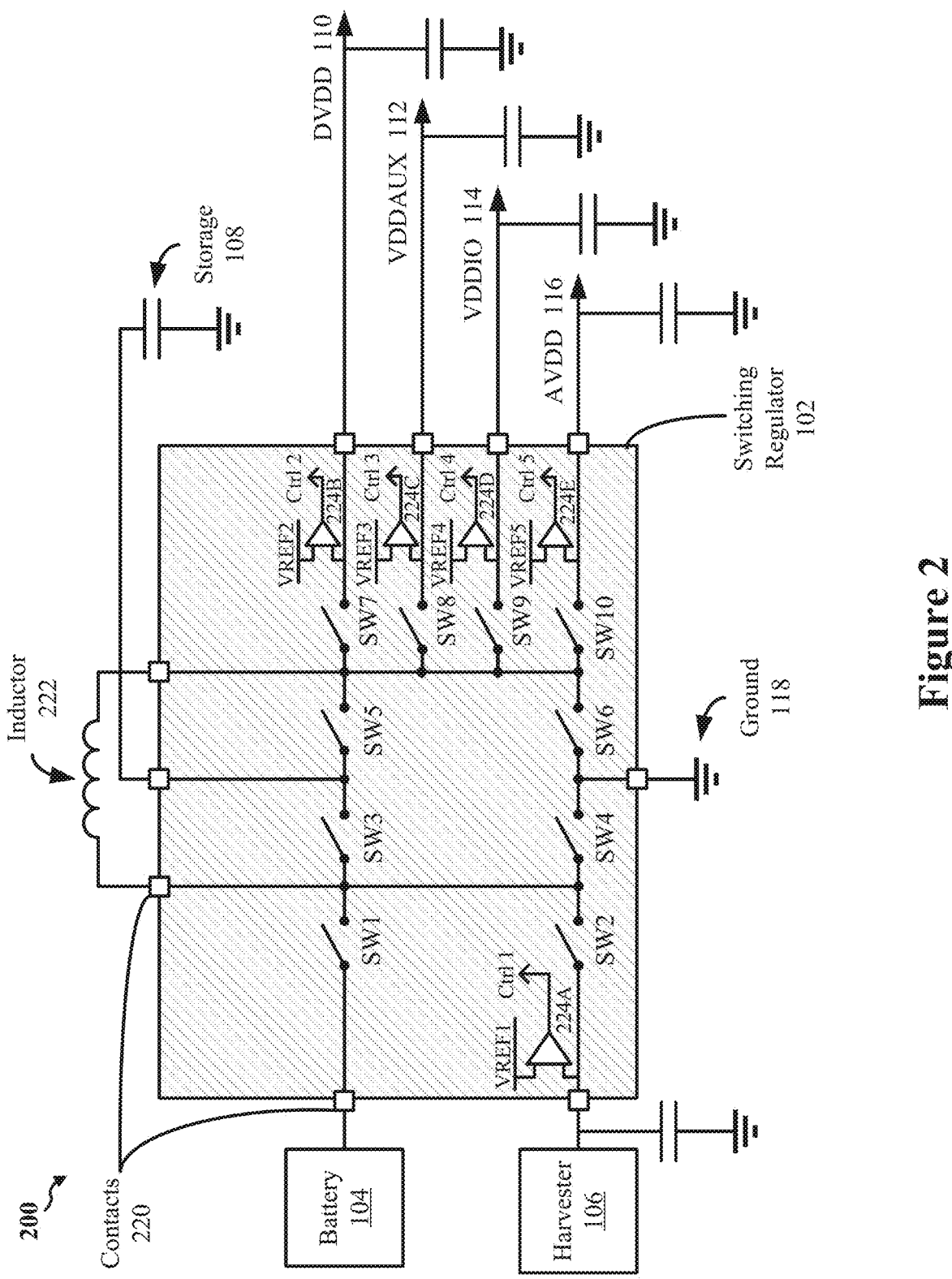
FIG. 2 shows a block diagram of the switching regulator in depicted FIG. 1.

FIG. 2 shows a block diagram 200 of the switching regulator 102 depicted in FIG. 1. The switching regulator 102 is depicted as an integrated circuit chip (IC chip or chip), with the switching regulator 102 including contacts 220 (such as beads or pads) to connect to other electronic components (such as the battery 104, the harvester 106, the storage 108, or the inductor 222).

The switching regulator 102 includes switches SW1 to SW10 to control the flow of energy from the battery 104, the harvester 106, and the storage 108 to the storage 108, the DVDD power rail 110, the VDDAUX power rail 112, the VDDIO power rail 114 and the AVDD power rail 116. To note, the storage 108 may be a source when providing energy to the rails 110-116 during discharge or may be a destination for energy when being charged by the harvester 106. The switches SW1-SW10 may be field effect transistors (FETs) or any other suitable power switching means, and which rail 110-116 is powered by which source 104-108 is based on the state of switches SW1-SW10. In particular, switches SW1-SW4 are source switches to control which source is used to provide power, and switches SW5-SW10 are destination switches to control which destination is to receive power.

The switching regulator 102 also includes comparators 224A-224E that generate control signals ctrl 1-ctrl 5 to control the switches to ensure the correct power source is powering the correct power rail and to maintain a stable voltage level at each power rail. For example, comparator 224A compares a voltage of the power input by the harvester 106 to a first reference voltage (VREF1) to generate ctrl 1. Ctrl 1 may be used to control one or more switches to charge storage 108 or to supply the power to one or more of the power rails 110-116. Comparator 224B compares a voltage of the DVDD power rail 110 to a second VREF (VREF2) to generate ctrl 2. Comparator 224C compares a voltage of the VDDAUX power rail 112 to a third VREF (VREF3) to generate ctrl 3. Comparator 224D compares a voltage of the VDDIO power rail 114 to a fourth VREF (VREF4) to generate ctrl 4. Comparator 224E compares a voltage of the AVDD power rail 116 to a fifth VREF (VREF5) to generate ctrl 5. Each control signal ctrl 2-ctrl 5 is used to trigger a switching event for the respective power rail if the voltage at the respective power rail deviates too far (such as by a tolerance) from the respective VREF to which the voltage is compared by the respective comparator. Such switching events are to ensure that each power rail maintains a stable voltage for its power being provided.

To note, VREF1-VREF5 may differ (or two or more may be the same) and they may be generated in any suitable manner. For simplicity, FIG. 2 does not depict control logic for controlling the switches based on the control signals ctrl 1-ctrl 5 (or other signals). FIG. 2 also does not depict other components of the switching regulator 102 (such as, e.g., specific voltage conversion components, diodes, etc.). In another example, the switching regulator 102 is a discontinuous mode switching regulator, and the switching regulator 102 may also include an input to indicate when to charge the storage 108, which is not depicted in FIG. 2.

Referring to the switching means, charging the storage 108 may be based on using switches SW2 and SW5, and charging the storage 108 may be in addition to powering at least one of the rails 110-116 by using at least one of the switches SW7-SW10. Switching from charging the storage 108 by the harvester 106 to discharging the storage 108 to power at least one of the rails 110-116 is based on using the switch SW3. Control signal ctrl 1 from comparator 224A coupled to the harvester 106, indicating that there is energy to be harvested and moved either to one or more of the output supplies 110, 112, 114, or 116 or the storage 108 (such as the voltage being less than VREF1 during the comparison), may cause switch SW2 to be used. The inductor 222 may be used to temporarily store energy from a power source 104 or 106 and deliver it to at least one of the rails 110-116 during switching events. As used herein, a switching event may refer to the sequence of states of the switches during this energy transfer process.

The switching regulator 102 is manufactured based on defined measures. For example, each power rail 110-116 is to output power at a specific voltage level defined for that power rail. In addition, charge and discharge times of the storage 108 may be defined based on the input power and inductance of the inductor 222. As depicted, the switching regulator 102 is defined to enable harvesting and is assumed to be used in electronic devices that utilize harvesting while providing the power rails 110-116 for powering various electronic components.

However, many electronic devices use a switching regulator defined to enable harvesting without the device itself utilizing harvesting. For example, an electronic device may not be coupled to or include a harvester 106. As such, the switching regulator 102 would not be coupled to a harvester 106, and the storage 108 goes unused as no harvester is configured to charge the storage 108. For example, the contact 220 that connects to storage 108 may also remain unconnected. In this manner, the switching regulator 102 is used only to regulate the power (including voltage conversion) from the battery 104 to the power rails 110-116.

It may be beneficial, though, for such a switching regulator to provide an additional power rail to power one or more electronic components that are inefficiently powered by the existing power rails or by another power component entirely (such as by a low dropout regulator (LDO)). As described herein, the multi-input, multi-output switching regulator defined to support harvesting may be configured to provide an additional power rail in electronic devices not utilizing harvesting. For example, the contact defined to be used for connecting to storage 108 for charge and discharge may instead be repurposed to provide a power rail (called a storage voltage (VSTORE) power rail herein).

Few additional components are required to generate the additional VSTORE power rail, with many of the switches of the switching regulator 102 being reused in configuring the switching regulator contact from an input/output defined for discharging and charging a storage 108 to being purely an output to provide an additional power rail. As such, one advantage of configuring the switching regulator to provide another power rail as compared to adding additional power components to generate a power rail is space savings on a circuit board or otherwise within the device and cost savings from not having to include the additional power components.

In addition, another advantage of the VSTORE power rail as compared to traditional means of generating another power rail is that the VSTORE power rail may be more energy efficient (especially for high power components). For example, when comparing the switching regulator to an LDO, an LDO dissipates power (heats up), which degrades power efficiency, while generation of power on the VSTORE power rail by a switching regulator does not cause such power dissipation at the switching regulator.

A further advantage of the VSTORE power rail as compared to traditional means of generating another power rail is that the VSTORE power can be configurable/programmable to a desired voltage level. Such a power rail may be beneficial for a central processing unit (CPU) employing dynamic voltage scaling (DVS) without requiring a multitude of power components typically required to generate a programmable power rail or to generate a plurality of power rails that may be needed for DVS.

Example implementations of an example power circuit including a switching regulator configured to provide a VSTORE power rail are described below with reference to FIG. 3.

Figure 3:
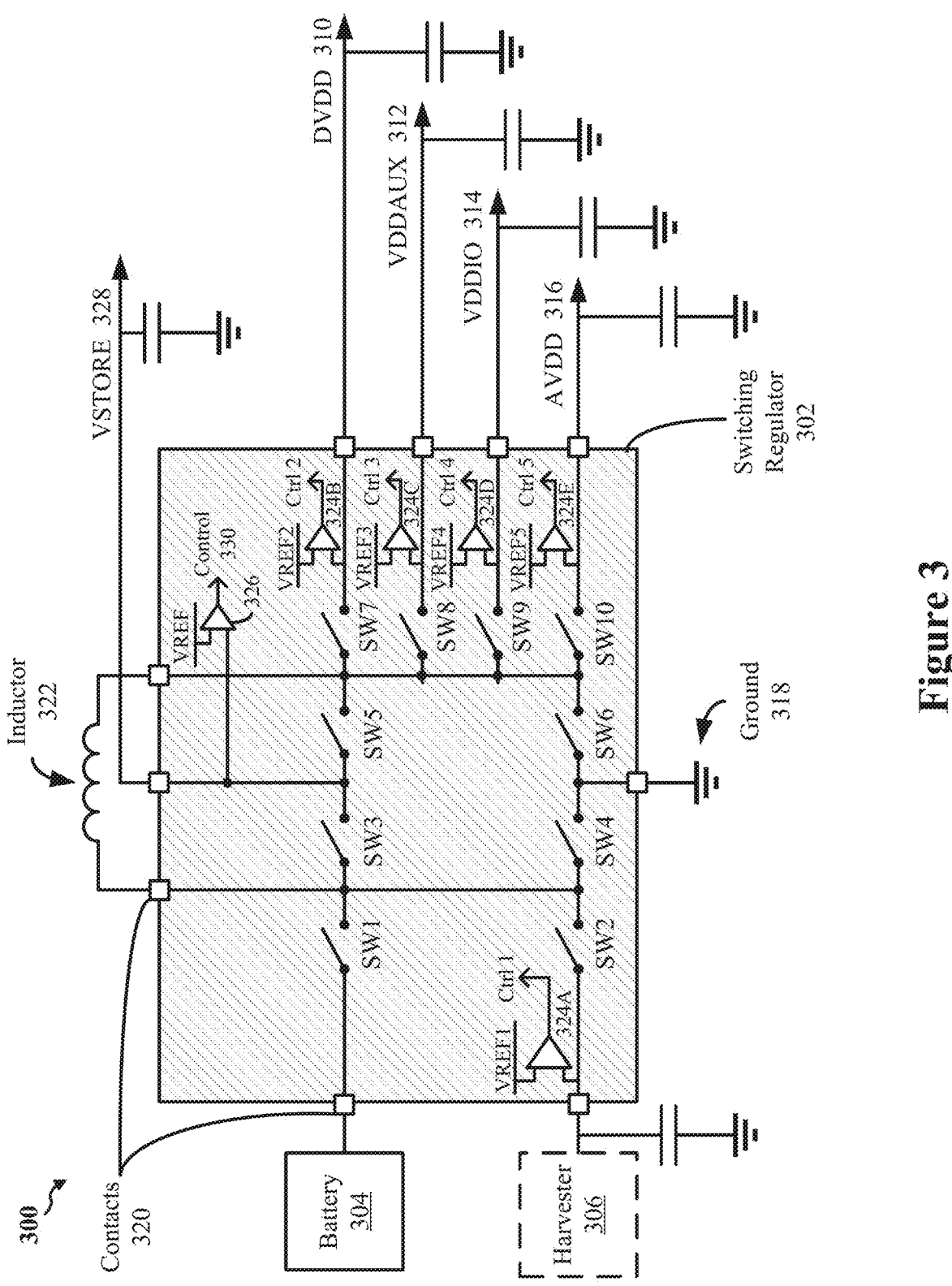
FIG. 3 shows a block diagram of an electronic circuit including a switching regulator configured to provide a storage voltage (VSTORE) power rail.

FIG. 3 shows a block diagram of an electronic circuit 300 including a switching regulator 302 configured to provide a VSTORE power rail 328. The switching regulator 302 is depicted as similar to the switching regulator 102 in FIG. 2, which may be a discontinuous mode, single inductor (based on inductor 322), multi-input, multi-output switching regulator. For example, the entire configuration of the switching regulator may be the same (including power switches SW1-SW10 in FIG. 3 being the same as power switches SW1-SW10 in FIG. 2, comparators 324A-324E in FIG. 3 being the same as comparators 224A-224E in FIG. 2, etc.).

However, in contrast to the switching regulator 102 depicted in FIG. 2, the switching regulator 302 is configured to provide a VSTORE power rail 328 instead of using an energy storage means (storage 108) to enable harvesting by a harvester (thus reusing the contact defined for coupling to such energy storage means). While the switching regulator 302 is depicted as similar to switching regulator 102 in FIG. 2, any suitable multi-input switching regulator that is defined to enable harvesting may be used. For example, a switching regulator with more, fewer, or different power rails than switching regulator 302 power rails 310-316 or a switching regulator that is not a single inductor controlled regulator 306 (with inductor 322) may be used.

In some implementations, an electronic device that includes a switching regulator 302 configured to provide a VSTORE power rail 328 includes a first input to receive a power from a power source (such as the battery 304) and a switching regulator capable of supporting energy harvesting. For example, a power circuit on a printed circuit board (PCB) or packaged in another manner may include a lead to be attached to battery 304 or another suitable power supply. As such, the switching regulator 302 includes a first contact defined as a first power input to the switching regulator, with the switching regulator's first contact being coupled to the first input (and thus to receive power from the power source). For example, the first contact 320 of the switching regulator 302 is coupled to the battery 304. The switching regulator 302 also includes a second contact defined as a second power input to the switching regulator, with the switching regulator's second contact being defined to be coupled to a harvester.

To note, the electronic device including the switching regulator 302 (or another suitable switching regulator to provide a VSTORE power rail) may not utilize harvesting. As such, the electronic device may not include or be coupled to a harvester 306. Alternatively, the electronic device may include or be coupled to a harvester 306, with the harvester 306 possibly coupled to the switching regulator 302. However, the switching regulator 302 may be controlled to keep switch SW2 always open, with the harvester 306 not enabled for use. As such, the second contact of the switching regulator may be coupled to a harvester (such as a contact 320 being coupled to the harvester 306), but receiving power from the harvester is disabled. Otherwise, the second contact may not be connected to a harvester. Since no harvester is used, the comparator 224A may be disabled from generating a control signal ctrl 1, thus causing no switching events associated with a harvester.

The switching regulator also includes a third contact whose output is defined as a storage voltage for harvesting. However, the output at the third contact is configured for use as a VSTORE power rail for one or more electronic components. For example, in comparing the switching regulator 102 in FIG. 2 and the switching regulator 302 in FIG. 3, instead of the switching regulator contact 220 being coupled to a storage 108 to enable harvesting (as in FIG. 2), the same contact 320 is coupled to (used as) the VSTORE power rail 328 to provide a VSTORE power from the switching regulator 302 to one or more electronic components.

For the depicted example discontinuous mode, single inductor, multi-input, multi-output switching regulator, the switching regulator 302 also includes a fourth contact defined as a DVDD power rail 310, a fifth contact defined as a VDDAUX power rail 312, a sixth contact defined as a VDDIO power rail 314, and a seventh contact defined as an AVDD power rail. While power rails 310-316 are depicted in FIG. 3 for the switching regulator 302, a suitable switching regulator may include more, fewer, or any other suitable output contacts for any suitable type of power rail.

Since the VSTORE power provided on the VSTORE power rail 328 does not come from a harvester, the power source providing the VSTORE power on the VSTORE power rail 328 is another suitable power supply coupled to the switching regulator 302 (such as the battery 304, which may be the same as battery 104). If the battery 304 is the power source for the VSTORE power rail 328, the switching regulator 302 may be controlled to use switches SW1 and SW5 so that power is provided at the VSTORE power rail 328 (as well as rails 310, 312, 314, 316, or 328). If no harvester is coupled to the contact 320 as depicted in FIG. 3, the logic used to control charging a storage from harvesting (thus using switches SW2 and SW5) may be modified to allow the battery 304 to provide power to the third contact for output on the VSTORE power rail 328 (as well as power rails 310, 312, 314, or 316 and with switch SW1 also used to enable the battery 304 to provide power for any of the destination power rails 310-316 and 328). If no harvester 306 is connected (with the switching regulator's second contact left unconnected), the second contact 320 defined to be coupled to a harvester may be left open or grounded.

In some implementations, the only additional component that is included in the electronic device so that the switching regulator 302 is configured to provide a VSTORE power rail 328 is a comparator 326 to compare the VSTORE power of the swing regulator's third contact to a reference voltage (VREF) to ensure that the VSTORE power on the VSTORE power rail 328 is maintained at a desired voltage level. If the difference between the VSTORE power and VREF is too great (such as a tolerance configured for the comparator 326), the comparator 326 generates a control signal 330 to trigger a switching event at the switching regulator 302 for the third contact so that the switching regulator 302 may adjust the VSTORE power to maintain a desired voltage level (i.e., the VREF voltage level) on the VSTORE power rail 328. The comparator 326 may be similar to any of the comparators 324B-324E. As such, VREF provided to comparator 326 may be the same or different than any of VREF1-VREF5. As depicted in FIG. 3, the switching regulator 302 may include the comparator 326. To note, though, in some implementations, the comparators may be outside of the switching regulator, with the control signals provided back to the switching regulator via one or more contacts.

If the voltage level on the VSTORE power rail 328 is based on VREF, the voltage level on the VSTORE power rail 328 may be a programmable value (such as by programming VREF to a desired voltage level). In this manner, the VSTORE power rail may be configured to provide power at any suitable voltage level for any suitable application (including for high power consumption components). In some implementations, the voltage level on the VSTORE power rail 328 may be programmable such that the VSTORE power rail 328 is coupled to a central processing unit (CPU) that employs dynamic voltage scaling (DVS) requiring the voltage level to be adjusted at different times. For example, VREF may be changed for a different VREF at a different voltage level or VREF may otherwise be adjusted to cause the switching regulator to provide a control signal 330 to cause one or more switching events to adjust the VSTORE power on the VSTORE power rail 328 to a desired voltage level. In some other implementations, the voltage level on the VSTORE power rail 328 may be adjustable (such as described above) to compensate for changes in power requirements of an electronic component attached to the VSTORE power rail 328 based on operating conditions of the component. For example, a power amplifier may have different power efficiencies based on the input voltage level for different power levels to be output by the power amplifier. As such, the voltage level of the VSTORE power on the VSTORE power rail 328 coupled to such a power amplifier may be adjusted based on the power level of the power to be output by the power amplifier.

The example implementations above describe an electronic device configured to include an additional VSTORE power rail from an output of a multi-input switching regulator defined to handle harvesting (but for which harvesting is not utilized in that electronic device). FIG. 4 is an illustrative flowchart 400 of operating an electronic device including such a switching regulator. To note, the operations in flowchart 400 are described as being performed with reference to the switching regulator 302 and other components in FIG. 3, but any suitable switching regulator configured to perform the operations described herein may be used.

At 402, the switching regulator 302 obtains, from a power source (such as the battery 304), a power to the first contact 320 of the switching regulator 302. The switching regulator 302 also includes a second contact 320 defined to be coupled to a harvester. As noted above, the electronic device including the switching regulator 302 does not utilize harvesting, but the switching regulator is defined to enable the use of harvesting. As such, the second contact that would be coupled to a harvester may remain unconnected for the specific electronic device not utilizing harvesting.

At 404, the switching regulator 302 outputs, at a third contact 320 of the switching regulator 302 coupled to a VSTORE power rail 328, a VSTORE power. As noted above, the third contact of the switching regulator is defined to be coupled to an energy storage means for harvesting. For example, the same contact of the switching regulator 102 in FIG. 2 is connected to a storage 108 for storing energy from the harvester 106. Since no harvester is used for the switching regulator 302 in FIG. 3, the third contact is repurposed for providing the VSTORE power rail 328.

At 406, the switching regulator 302 provides the VSTORE power from the VSTORE power rail 328 to one or more electronic components. As noted above, in some implementations, the voltage level of the VSTORE power is programmable (such as based on VREF). As such, the one or more electronic components coupled to the VSTORE power rail 328 may be components that can improve power efficiency based on different voltage levels (such as certain power amplifiers) or that require adjustable voltage levels (such as a CPU employing DVS). As depicted in FIG. 3, providing the VSTORE power on the VSTORE power rail 328 is in addition to power provided on any of the other power rails 310-316.

In some implementations, the switching regulator 302 includes the comparator 326 to ensure that the VSTORE power is maintained at a stable, desired voltage level. For example, at 408, the comparator 326 of the switching regulator 302 may compare a voltage of the VSTORE power (which may be from a lead to the third contact of the switching regulator) and a VREF. The output of the comparator is a control signal 330 to trigger a switching event at the switching regulator 302 to maintain a desired voltage level of the VSTORE power (such as the same as VREF) on the VSTORE power rail 328.

Various implementations are described above for providing an additional a VSTORE power rail by reusing existing components of a power regulator that is defined to support harvesting but for which the electronic device does not utilize harvesting. To note, variations to the power circuit (such as the switching regulator) exist while not deviating from the scope of this application. For example, while a comparator 326 for the VSTORE power rail 328 is depicted as being included in the switching regulator 302, in some implementations, the comparator 326 may be a discrete component outside of the switching regulator 302. In this manner, the same chip that is the switching regulator in FIG. 2 may be connected to a separate comparator and configured in order to generate a VSTORE power rail.

In addition, as used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can In some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example operations in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. An electronic device, comprising:
   a first input to receive a power from a power source;
   a switching regulator, wherein the switching regulator includes:
      a first contact defined as a first power input to the switching regulator, wherein the first contact is coupled to the first input;
      a second contact defined as a second power input to the switching regulator, wherein the second contact is defined to be coupled to a harvester; and
      a third contact whose output is defined as a storage voltage for harvesting, wherein:
         the third contact is defined to be coupled to an energy storage means that stores energy harvested from the harvester; and
         the third contact is coupled to a voltage (VSTORE) power rail for one or more electronic components and the output at the third contact is a VSTORE power on the VSTORE power rail, wherein energy from the first input is delivered to the VSTORE power rail; and
         the one or more components is coupled to the VSTORE power rail,
   wherein the switching regulator further includes a comparator, wherein the comparator includes:
      a first comparator input coupled to a line leading to the third contact of the switching regulator;
      a second comparator input configured to receive a reference voltage (VREF); and
      a comparator output that is a control signal, wherein the comparator is configured to trigger a switching event at the switching regulator for the third contact based on a comparison between a voltage of the VSTORE power at the third contact and the VREF, wherein the switching event is associated with the VSTORE power rail maintaining a desired voltage level.

2. The electronic device of claim 1, wherein the desired voltage level on the VSTORE power rail is programmable.

3. The electronic device of claim 2, wherein the VSTORE power rail is coupled to a central processing unit (CPU) that employs dynamic voltage scaling.

4. The electronic device of claim 2, wherein the VSTORE power rail is coupled to a power amplifier, wherein the power amplifier's power efficiency is based on a voltage level of an input power to the power amplifier and a power level of the output power from the power amplifier.

5. The electronic device of claim 1, wherein the switching regulator is a discontinuous mode, single inductor, multi-input, multi-output switching regulator, wherein the switching regulator is coupled to an inductor and the switching regulator further includes:

a fourth contact defined as a digital VDD (DVDD) power rail;

a fifth contact defined as an auxiliary VDD (VDDAUX) power rail;

a sixth contact defined as an input/output VDD (VDDIO) power rail; and a seventh contact defined as an analog VDD (AVDD) power rail.

6. A method of operation by an electronic device, comprising:

obtaining, from a power source, a power to a first contact of a switching regulator of an electronic device, wherein the switching regulator includes a second contact defined to be coupled to a harvester;

outputting, at a third contact of the switching regulator coupled to a storage voltage (VSTORE) power rail, a VSTORE power, wherein the third contact of the switching regulator is defined to be coupled to an energy storage means for harvesting; and providing, to one or more electronic components of the electronic device, the VSTORE power from the VSTORE power rail wherein the switching regulator further includes a comparator, wherein the comparator includes:

a first comparator input coupled to a line leading to the third contact of the switching regulator;

a second comparator input configured to receive a reference voltage (VREF); and a comparator output that is a control signal, wherein the comparator is configured to trigger a switching event at the switching regulator for the third contact based on the comparison between a voltage of the VSTORE power at the third contact and the VREF, wherein the switching event is associated with the VSTORE power rail maintaining a desired voltage level.

7. The method of claim 6, further comprising comparing, by a comparator of the switching regulator, a voltage of the VSTORE power and a reference voltage (VREF), wherein an output of the comparator is a control signal to trigger a switching event at the switching regulator to maintain a desired voltage level of the VSTORE power on the VSTORE power rail.

8. The method of claim 7, further comprising outputting one or more of:

a digital VDD (DVDD) power at a fourth contact of the switching regulator defined as a DVDD power rail;

an auxiliary VDD (VDDAUX) power at a fifth contact of the switching regulator defined as a VDDAUX power rail;

an input-output VDD (VDDIO) power at a sixth contact of the switching regulator defined as a VDDIO power rail; or an analog VDD (AVDD) power at a seventh contact of the switching regulator defined as an AVDD power rail, wherein the switching regulator is a discontinuous mode, single inductor, multi-input, multi-output switching regulator and the switching regulator.

9. The method of claim 6, wherein the desired voltage level on the VSTORE power rail is programmable.

10. The method of claim 9, further comprising providing power on the VSTORE power rail to a central processing unit (CPU) that employs dynamic voltage scaling.

11. The method of claim 9, further comprising providing power on the VSTORE power rail to a power amplifier, wherein the power amplifier's power efficiency is based on a voltage level of an input power to the power amplifier and a power level of the output power from the power amplifier.

12. A switching regulator of an electronic device, comprising:

a first contact defined as a first power input to the switching regulator, wherein the first contact is defined to be coupled to a first power source;

a second contact defined as a second power input to the switching regulator, wherein the second contact is defined to be coupled to a harvester;

a third contact whose output is defined as a storage voltage for harvesting, wherein: the third contact is defined to be coupled to an energy storage means that stores energy harvested from the harvester; and the third contact is coupled to a voltage (VSTORE) power rail for one or more electronic components and the output at the third contact is a VSTORE power on the VSTORE power rail, wherein energy from the first input is delivered to the VSTORE power rail;

wherein the switching regulator further includes a comparator, wherein the comparator includes:

a first comparator input coupled to a line leading to the third contact of the switching regulator;

a second comparator input configured to receive a reference voltage (VREF); and a comparator output that is a control signal, wherein the comparator is configured to trigger a switching event at the switching regulator for the third contact based on the comparison between a voltage of the VSTORE power at the third contact and the VREF, wherein the switching event is associated with the VSTORE power rail maintaining a desired voltage level.

13. The switching regulator of claim 12, wherein the desired voltage level on the VSTORE power rail is programmable.

14. The switching regulator of claim 13, wherein the VSTORE power rail is coupled to a central processing unit (CPU) that employs dynamic voltage scaling.

15. The switching regulator of claim 13, wherein the VSTORE power rail is coupled to a power amplifier, wherein the power amplifier's power efficiency is based on a voltage level of an input power to the power amplifier and a power level of the output power from the power amplifier.

16. The switching regulator of claim 12, wherein the switching regulator is a discontinuous mode, single inductor, multi-input, multi-output switching regulator, wherein the switching regulator is coupled to an inductor and the switching regulator further includes:

a fourth contact defined as a digital VDD (DVDD) power rail;

a fifth contact defined as an auxiliary VDD (VDDAUX) power rail;

a sixth contact defined as an input/output VDD (VDDIO) power rail; and a seventh contact defined as an analog VDD (AVDD) power rail.

* * * * *